(No Model.) 2 Sheets—Sheet 1.
E. EDWARDS.
COIN FREED APPARATUS FOR EXHIBITING OPTICAL ILLUSIONS.
No. 459,065. Patented Sept. 8, 1891.
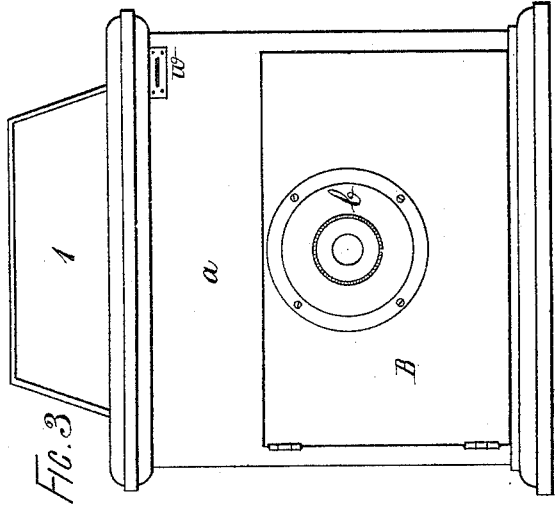
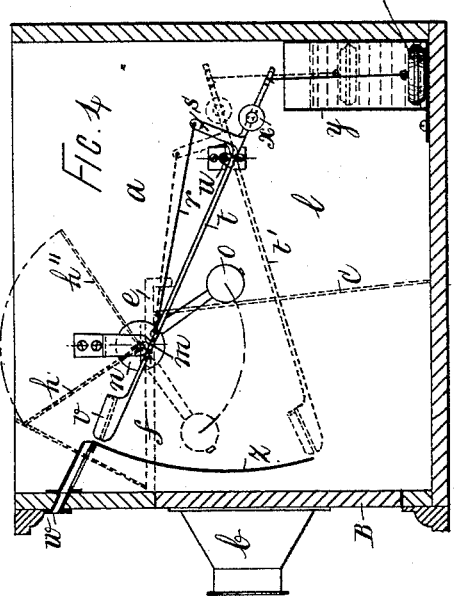
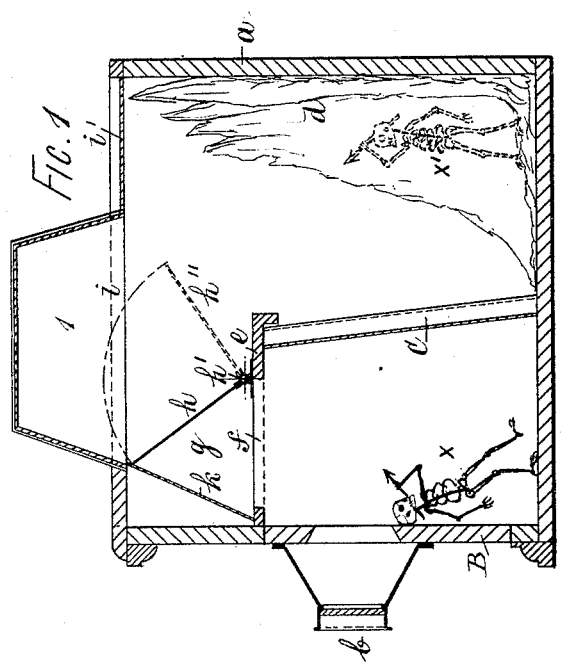
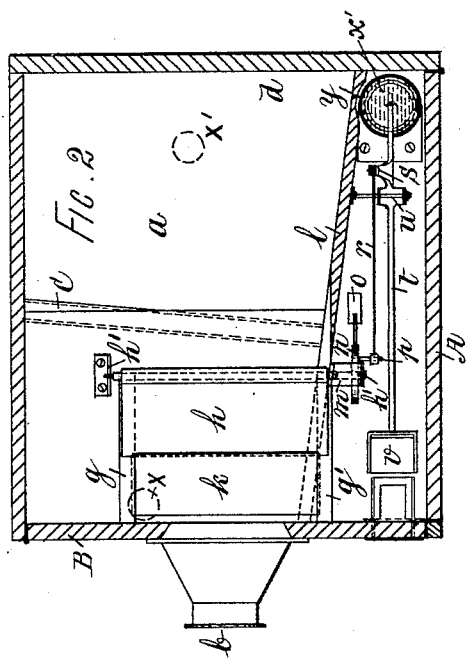
Witnesses:
W. Harvey Muzzy
G. M. Copenhaver
Inventor:
Edmund Edwards
by W. H. Babcock
Attorney (No Model.) 2 Sheets—Sheet 2.
E. EDWARDS.
COIN FREED APPARATUS FOR EXHIBITING OPTICAL ILLUSIONS.
No. 459,065. Patented Sept. 8, 1891.
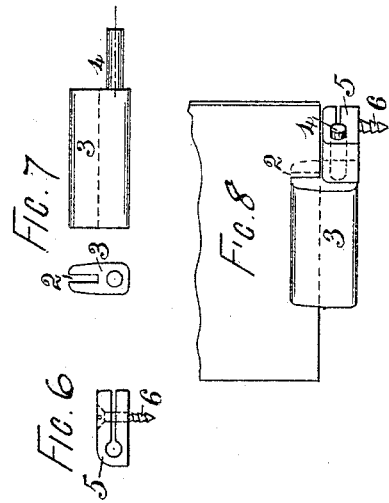
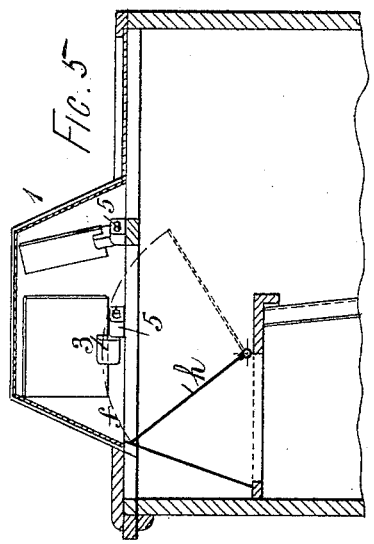
Witnesses:
W. Harvey Muzzy
G. M. Coffenhaver
Inventor:
Edmund Edwards
by W. H. Babcock
Attorney

UNITED STATES PATENT OFFICE.

EDMUND EDWARDS, OF LONDON, ENGLAND.

COIN-FREED APPARATUS FOR EXHIBITING OPTICAL ILLUSIONS.

SPECIFICATION forming part of Letters Patent No. 459,065, dated September 8, 1891.

Application filed May 12, 1891. Serial No. 392,493. (No model.) Patented in England March 20, 1890, No. 4,391; in France January 6, 1891, No. 210,622, and in Belgium February 20, 1891, No. 93,843.

*To all whom it may concern:*

Be it known that I, EDMUND EDWARDS, a subject of the Queen of Great Britain, residing at 35 Southampton Buildings, Chancery Lane, in the county of Middlesex, England, have invented a new and useful Coin-Freed Apparatus for Exhibiting Optical Illusions, (for which I have obtained a patent in Great Britain, dated March 20, 1890, No. 4,391; in France, dated January 6, 1891, No. 210,622, and in Belgium, dated February 20, 1891, No. 93,843,) of which the following is a specification.

My invention relates to apparatus consisting of a box or chamber having an opening into which an observer looks and beholds an optical illusion after a previously-determined coin has been first inserted into an opening made for the purpose.

The illusion which I use is of the kind in which one or more spectral figures or objects are made to appear in front of a suitably-prepared background by means of a reflection from a sheet of transparent glass arranged across the box or chamber, the spectral illusion only appearing when natural or artificial light is thrown upon the figure and disappearing when the light is withdrawn and it ceases to be illuminated, the observer only then seeing the background through the transparent sheet of glass, which is not itself seen.

The character of the illusion produced may be varied as desired; but supposing that the background in the box is designed to represent a cave in which a skeleton is to appear as a specter, I arrange the figure of a skeleton of proper size in an inclined position below the opening or eye-piece through which the observer looks and in front of the inclined sheet of transparent glass, which is arranged across the box at a suitable distance from the eye-piece and at such an inclination as to cause the figure to appear in the desired position.

The background and sides of the box representing a cave are sufficiently well lighted by openings at the sides or top, such openings being arranged so as not to allow any light to fall upon the skeleton figure, which figure is only lighted when necessary by direct light or light reflected upon it by one or more mirrors through an opening above it or at the side in front of the transparent glass.

In order to make the spectral figure appear and disappear, I arrange a shutter, by which the opening last described can be opened or closed, so as to either illuminate the skeleton or to shut off the light from it, and I arrange this shutter so that in its normal position it is closed and cannot be opened until a determined coin has been first introduced into an opening provided to receive it, when it is automatically operated.

The accompanying drawings are an illustration of my invention.

Figure 1 is a longitudinal vertical section through the apparatus in which the opening and closing of the shutter are effected automatically by the weight of the coin, means being added of retarding the movement of the shutter, so that it may remain open for a sufficient time. Fig. 2 is a horizontal section, Fig. 3 is a front view, and Fig. 4 a vertical section, of the same, showing the retarding apparatus; and Figs. 5, 6, 7, and 8 show the devices for holding and adjusting the reflecting-mirrors.

Similar letters and numerals refer to similar parts throughout the several figures.

In the drawings, $a$ is a box or chamber, and $b$ an opening or eye-piece, through which the observer looks.

$c$ is a transparent sheet of glass inclined in the proper position, and $d$ is a background of any suitable kind, which is seen through the glass $c$. The object—such as a skeleton—is placed inside the box $a$ at X and is invisible until sufficiently illuminated, when its reflection is seen from the surface of the glass $c$, the figure then appearing to be at X'. The space above the glass $c$ is closed by the partition $e$, which has an opening through it at $f$, the sides of the opening being provided above with the inclined partitions $g\,g'$, against which a light shutter $h$, turning upon centers at $h'$, closes, so as to prevent light from above from illuminating the figure X, but allowing the latter to be lighted when the shutter is opened, as shown at dotted lines at $h''$. An opening at $i$ is provided at the top of the box, through which the light enters, and is directed through the opening $f$ upon the figure, and $k$ is a fixed mirror, which aids in directing the light in the way required. The background at $d$ is also sufficiently illuminated through the opening $i$, and the part $i'$ of the top of the box may also be made of glass or other sufficiently-transparent material.

$l$ is a partition by which a part of the box is divided from the remainder for a sufficient height. The axis of the shutter $h$ passes through this partition $l$ and turns in a bearing $m$, attached to the latter. The axis carries a disk $n$, provided with a balance-weight $o$, by which the shutter is balanced, and the disk carries a crank-pin $p$, upon which the light connecting rod or wire $r$ fits and connects it to the arm $s$ of a lever $t$, which turns freely upon a center $u$, carried by the partition. The lever $t$ is provided at its outer extremity with a coin tray or receptacle $v$, into which a coin introduced through a slit $w$ in the front of the box falls and by its weight causes the lever $t$ to descend, thereby opening the shutter $h$ until the lever reaches the position shown in dotted lines at $t'$ in Fig. 4, the coin then falling off, when the lever returns to its original position by a weight at its other end $x$.

I make use of an additional weight in the form of a piston or plunger fitting in a cylinder $y$ and hung to the end of the lever $t$. The cylinder $y$ is filled with a suitable liquid—such as oil, glycerine, or a mixture of glycerine and water—and the piston is perforated with one or more small holes, or has a space left round its periphery, so that it can only move up and down in the cylinder at a slow speed, such speed being regulated by the size of the space through which the liquid has to pass, or by the viscosity of the latter I place an adjustable balance-weight $x$ upon the lever $t$, by which its movement can be more accurately adjusted.

$z$ is a curved plate by which the coin is prevented from falling off the lever too soon.

I preferably close the side of the box by a door A, provided with a lock, so that ready access can be had to the gear described and the coins which fall in the bottom of the box can be removed. I also preferably make the front of the box B open upon hinges, so that the figure X can be conveniently arranged and fixed against it, its inside being covered by a material such as black velvet, from which light is not readily reflected. The part of the back of the box behind the reflection X' is also preferably similarly covered and the remainder of the interior of the box may be blackened.

The arrangement of the details and of the actuating and retarding apparatus described and shown may be varied more or less.

In the arrangements described the opening in the top of the box is closed by a cover 1, the sides and top of which are formed of ground or preferably fluted glass, which allows sufficient light to pass through without being transparent to sight. Inside this translucent cover 1 arrange one or more mirrors, by which light may be thrown upon the figure through the opening $f$. I prefer to make these mirrors adjustable, so that they can be fixed exactly in the right position, as shown in Fig. 5. For this purpose the edge of the mirror is inserted into a slit 2 in a piece of wood or other material 3. (Shown on a larger scale in Figs. 7 and 8.) This piece has a pin 4 formed at its end, which fits freely into a corresponding hole in a clip 5, Figs. 6 and 8, which is cut through at one side, so that the screw 6, which holds it in its place, tightens it upon the pin 4, and at the same time holds the clip firmly in its position. Any other form of support may, however, be used. Where the apparatus is to be used both by day and night, I prefer to use two mirrors so adjusted that one reflects the daylight and the other the gas or other artificial light.

The character of the background and of the spectral figure may be varied as may be desired, and two or more figures may be made to appear and disappear and their arms or limbs may be made to move by connections with the movable part of the apparatus.

Instead of the light upon the figure being admitted and cut off by a shutter, a reflecting-mirror may be made to turn upon centers, as required for the same purpose; or if gas, electricity, or other artificial light is used such light may be raised or lowered, as required, by the apparatus described instead of or as well as the latter operating a shutter.

The spectral figure may point to a legend, number, or device upon a wheel which is set in revolution when a coin is introduced, so as to act as a so-called "fortune-telling" apparatus, the wheel having different devices or numbers round its circumference and coming to rest before the spectral figure becomes fully visible, so that the latter points to a device which happens to stop opposite to it. Instead of the spectral figure being made to appear and then disappear, it may be visible in its normal position, the shutter being opened, and the latter is made to close and then reopen, so that the figure disappears and then reappears. Instead of a light figure upon a dark background, a dark figure may be made to appear upon a light background.

A phonograph may be arranged in or in connection with the box, actuated by clock-work and set in motion by the release of a detent moved by the weight of the coin, so that the spectral figure may appear to utter any words or sounds.

I do not confine myself to the precise form and arrangement of the apparatus described and shown, which may be varied more or less, as may be found advisable.

Having thus described my invention, what I claim as new, and desire to secure by Letters Patent, is—

1. In a coin-freed apparatus, the combination of the mechanism for opening the shutter thereof for a specified time, with an optical illusion consisting of a figure and mirrors so arranged as to make the illusion visible from a given point when said shutter is opened, substantially as set forth.

2. In a coin-freed apparatus, the combination of a containing-receptacle with a figure and mirrors so arranged therein that an illusion of said figure will appear when light is cast on it and a coin-actuated mechanism to cut off and supply light, substantially as set forth.

3. The combination, with the apparatus by which the appearance and disappearance of a spectral illusion are effected, consisting of a chamber having a transverse sheet of transparent glass, a suitable figure, and a shutter by which light is admitted to and cut off from the figure, of a lever $t$, coin-receptacle $v$, arm $s$, actuating the shutter $h$, and cylinder $y$, containing a weight immersed in fluid and connected to the lever $t$, all substantially as set forth.

4. In combination with the apparatus by which the appearance and disappearance of a spectral illusion are effected after a predetermined coin has been inserted into an opening provided for it, the fastening for holding the light-reflecting mirrors in any position, consisting of a piece 3, having a slit at 2 and a pin 4, and a split clip 5, having a hole fitting the pin 4, all substantially as set forth.

5. In a coin-freed apparatus, the combination of a receptacle with a shutter fixed in the top thereof, a coin-receiver mounted on one end of a pivoted arm, a regulator at the other end of said arm, connections between said arm and said shutter, a spectral figure, and mirrors arranged to cause an optical illusion of said figure to appear when the said shutter is opened, all substantially as set forth.

EDMUND EDWARDS.

Witnesses:
ARTHUR E. EDWARDS,
HAROLD KENNEDY.